United States Patent
Wu et al.

(10) Patent No.: US 12,312,457 B2
(45) Date of Patent: May 27, 2025

(54) SILICONE ENHANCED ETHYLENE/ALPHA-OLEFIN INTERPOLYMERS FOR IMPROVED STIFFNESS-TOUGHNESS BALANCE

(71) Applicant: Dow Global Technologies LLC, Midland, MI (US)

(72) Inventors: Gaoxing Wu, Lake Jackson, TX (US); Jeffrey C. Munro, Jr., Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 708 days.

(21) Appl. No.: 17/272,337

(22) PCT Filed: Aug. 27, 2019

(86) PCT No.: PCT/US2019/048356
§ 371 (c)(1),
(2) Date: Feb. 28, 2021

(87) PCT Pub. No.: WO2020/046946
PCT Pub. Date: Mar. 5, 2020

(65) Prior Publication Data
US 2021/0340362 A1  Nov. 4, 2021

Related U.S. Application Data

(60) Provisional application No. 62/724,113, filed on Aug. 29, 2018.

(51) Int. Cl.
| C08L 23/08 | (2025.01) |
| C08L 23/0807 | (2025.01) |
| C08L 23/16 | (2006.01) |

(52) U.S. Cl.
CPC ........... C08L 23/0815 (2013.01); C08L 23/16 (2013.01); *C08L 2205/035* (2013.01)

(58) Field of Classification Search
CPC . C08L 23/0815; C08L 23/16; C08L 2205/035
USPC ....................................................... 524/451
See application file for complete search history.

(56) References Cited

U.S. PATENT DOCUMENTS

| 4,535,113 A | 8/1985 | Foster et al. |
| 4,588,775 A | 5/1986 | McCullough, Jr. |
| 5,078,085 A | 1/1992 | Fuji et al. |
| 5,585,420 A | 12/1996 | Grasmeder et al. |
| 5,639,810 A | 6/1997 | Smith, III et al. |
| 5,814,697 A | 9/1998 | Akao et al. |
| 5,902,854 A | 5/1999 | Kelley et al. |
| 5,925,703 A | 7/1999 | Betso et al. |
| 6,080,489 A | 6/2000 | Mehta |
| 6,136,937 A | 10/2000 | Lai et al. |
| 6,417,271 B1 | 7/2002 | Nishihara et al. |
| 6,569,931 B2 | 5/2003 | Furukawa et al. |
| 9,023,925 B2 | 5/2015 | Qi et al. |
| 9,023,935 B2 | 5/2015 | Fantinel et al. |
| 9,243,140 B2 | 1/2016 | Walton et al. |
| 9,714,337 B2 | 7/2017 | Massari et al. |
| 2003/0181553 A1 | 9/2003 | Moriya et al. |
| 2007/0244234 A1 | 10/2007 | Adur |
| 2008/0093768 A1 | 4/2008 | Batistini et al. |
| 2010/0204381 A1 | 8/2010 | Heck |
| 2015/0217546 A1 | 8/2015 | Igarashi et al. |

FOREIGN PATENT DOCUMENTS

| CN | 106336583 A | 1/2017 | |
| EP | 1403313 B1 * | 9/2008 | .............. C08J 3/124 |
| JP | H11140307 | 5/1999 | |
| JP | 2002011838 | 1/2002 | |
| JP | 2002167481 A | 6/2002 | |
| JP | 2007262425 | 10/2007 | |
| JP | 2012113038 | 6/2012 | |
| JP | 2012219119 | 11/2012 | |
| JP | 2016074824 | 5/2016 | |
| JP | 2016182184 | 10/2016 | |

OTHER PUBLICATIONS

PCT/US2019/048356, International Search Report and Written Opinion with a mailing date of Oct. 29, 2019.
Office Action from corresponding Korean Patent Application: 10-2021-7008630 dated Jun. 5, 2024.

* cited by examiner

*Primary Examiner* — Ling Siu Cho
*Assistant Examiner* — Ronald Grinsted
(74) *Attorney, Agent, or Firm* — Karen L. Beckman

(57) ABSTRACT

A composition comprising the following: A) an ethylene/alpha-olefin interpolymer having a density from 0.854 to 0.890 g/cc, and a melt index (I2) from 0.2 to 30 g/10 min; B) a silicone oil having a viscosity≤5000 cSt, at 25° C.; and wherein component B is present in an amount from 1.0 wt % to 5.0 wt %, based on the weight of the sum weight of components A and B.

10 Claims, No Drawings

SILICONE ENHANCED ETHYLENE/ALPHA-OLEFIN INTERPOLYMERS FOR IMPROVED STIFFNESS-TOUGHNESS BALANCE

CROSS REFERENCE TO RELATED APPLICATIONS

The present application claims benefit of priority to U.S. Application No. 62/724,113, filed on Aug. 29, 2018, which is incorporated herein by reference in its entirety.

BACKGROUND OF THE INVENTION

Ethylene/alpha-olefin elastomers have been used for several decades as impact modifiers to polypropylene, particularly for talc-filled polypropylene compositions commonly referred to as TPO compositions. TPO compositions are prevalent in the automotive industry, where they are used to make interior and exterior car parts, such as bumper fascia, interior door panels, airbag covers, and many other components. There is a demand for elastomer composition to further improve the low-temperature impact performance and melt flowability of the TPO compositions. Currently, lower density and higher melt index elastomers have been developed for this purpose; however, such elastomers often reduce the TPO stiffness and are difficult to maintain in free-flowing pellet form, due to the increased stickiness and tendency to block or mass during transportation or storage, particularly at elevated temperatures. As the free-flowing-pellet form of ethylene/alpha-olefin elastomers has offered the TPO compounders substantially lower processing cost; there is a need for new TPO compositions that contain relatively low density and relatively low melt index elastomers, and which have improved low-temperature impact performance (toughness), and melt flowability. Elastomeric resins and formulations are described in the following references: U.S. Pat. Nos. 4,535,113, 5,078,085, 5,585,420, 5,639,810, 5,902,854, 5,925,703, 6,417,271, 6,136,937, 9,023,935, 9,714,337; and U.S. Publication Nos. 2007/0244234, 2008/0093768, 2010/676422. Additional references include U.S. Pat. Nos. 6,080,489, 6,569,931 and 9,243,140.

Previously, in TPO applications, silicone-based materials (particularly, ultra-high-molecular-weight polydimethylsiloxane (PDMS) master batches) have been used to improve the scratch resistance of TPO compositions. However, these PDMS/silicone incorporated formulations are not capable of improving other physical properties of the TPO compositions, such as the stiffness-toughness balance and the melt flowability. As discussed, there is a need for TPO compositions that have an improved balance of the low-temperature impact performance (toughness), melt flowability, and stiffness. This need has been met by the following invention.

SUMMARY OF THE INVENTION

A composition comprising:
A) an ethylene/alpha-olefin interpolymer having a density from 0.854 to 0.890 g/cc, and a melt index (I2) from 0.2 to 30 g/10 min;
B) a silicone oil having a viscosity≤5000 cSt, at 25° C.; and
wherein component B is present in an amount from 1.0 wt % to 5.0 wt %, based on the weight of the sum weight of components A and B.

DETAILED DESCRIPTION

Compositions have been discovered, as described herein, that provide excellent low-temperature impact (toughness), excellent stiffness (flexural modulus), and improved melt flowability (melt flow rate) in TPO applications. These compositions have excellent stiffness and low-temperature toughness, and meanwhile substantially increase the melt flow rate, to maintain good processibility.

As discussed above, a composition is provided that comprises the following:
A) an ethylene/alpha-olefin interpolymer having a density from 0.854 to 0.890 g/cc, or from 0.855 g/cc to 0.885 g/cc, or from 0.860 g/cc to 0.880 g/cc, or from 0.865 g/cc to 0.875 g/cc (1 g/cc=1 g/cm$^3$), and a melt index (I2) from 0.2 to 30 g/10 min, or from 0.3 to 20 g/10 min, or from 0.4 to 10 g/10 min, or from 0.5 to 5.0 g/10 min, or from 0.5 to 2.0 g/10 min;
B) a silicone oil having a viscosity≤5000 cSt, or ≤4000 cSt, or ≤3000 cSt, or ≤2000 cSt, or ≤1000 cSt, or ≤500 cSt, at 25° C.; and
wherein component B is present in an amount from 1.0 wt % to 5.0 wt %, or from 1.0 wt % to 4.5 wt %, or from 1.0 wt % to 4.0 wt %, or from 1.0 wt % to 3.5 wt %, or from 1.0 wt % to 3.0 wt %, based on the weight of the sum weight of components A and B.

An inventive composition may comprise a combination of two or more embodiments described here. Component A may comprise a combination of two or more embodiments described here. Component B may comprise a combination of two or more embodiments described here.

In one embodiment, or a combination of embodiments described herein, the silicone oil has a viscosity≥20 cSt, or ≥30 cSt, or ≥40 cSt, or ≥50 cSt, or ≥60 cSt, or ≥70 cSt, or ≥80 cSt, or ≥90 cSt or ≥100 cSt and ≤5000 cSt, or ≤4500 cSt, or ≤4000 cSt, or ≤3500 cSt, or ≤3000 cSt, or ≤2500 cSt, or ≤2000 cSt at 25° C.

In one embodiment, or a combination of embodiments described herein, the silicone oil has a viscosity from 50 to 5000 cSt, at 25° C., or from 60 to 4000 cSt, at 25° C., or from 70 to 3000 cSt, at 25° C., or from 80 to 2000 cSt, at 25° C., or from 90 to 1000 cSt, at 25° C., or from 100 to 500 cSt, at 25° C.

In one embodiment, or a combination of embodiments described herein, the weight ratio of component A to component B is from 19 to 99, or from 24 to 76, or from 27 to 62, or from 32 to 49.

In one embodiment, or a combination of embodiments described herein, the ethylene/alpha-olefin interpolymer of component A is in pellet form.

In one embodiment, or a combination of embodiments described herein, the ethylene/alpha-olefin interpolymer of component A is an ethylene/alpha-olefin copolymer. In a further embodiment, the alpha-olefin is a C3-C20 alpha-olefin, and further a C3-C10 alpha-olefin.

In one embodiment, or a combination of embodiments described herein, the ethylene/alpha-olefin interpolymer of component A is an ethylene/alpha-olefin/diene interpolymer, and further an EPDM and further the diene is ENB.

In one embodiment, or a combination of embodiments described herein, the ethylene/alpha-olefin interpolymer of component A is an ethylene/alpha-olefin/diene interpolymer, and further an EPDM and further the diene is ENB. In one embodiment, or a combination of embodiments described herein, the ethylene/alpha-olefin/diene interpolymer has a "% Peak Area (from 21.3 to 22.0 ppm)"≥3.0%, or ≥4.0%, or ≥5.0%, or ≥6.0%, or ≥7.0%, or ≥8.0%, or ≥9.0% or ≥10%, or ≥11%, or ≥12%, or ≥13%, or ≥14%, or ≥15%, or ≥16%, or ≥17%, or ≥18%, or ≥19% or ≥20%, as determined by 13C NMR (propylene tacticity marker), as described herein. In one embodiment, or a combination of embodiments described herein, the ethylene/alpha-olefin/diene interpolymer has a "% Peak Area (from 21.3 to 22.0 ppm)"≤40%, or ≤35%, or ≤30%, as determined by 13C NMR, as described herein.

In one embodiment, or a combination of embodiments described herein, component A has a density≤0.890, or ≤0.888, or ≤0.886, or ≤0.884, or ≤0.882, or ≤0.880, or ≤0.878, or ≤0.876, or ≤0.874 g/cc. In one embodiment, or a combination of embodiments described herein, the least one ethylene/alpha-olefin inter-polymer of component A has a density≥0.854 g/cc. or ≥0.862, or ≥0.864 g/cc, or ≥0.866, or ≥0.868 g/cc (1 cc=1 cm$^3$).

In one embodiment, or a combination of embodiments described herein, the ethylene/alpha-olefin interpolymer of component A has a density from 0.854 to 0.900 g/cc, or from 0.862 g/cc to 0.890 g/cc, or from 0.865 g/cc to 0.890 g/cc, or from 0.865 g/cc to 0.885 g/cc, or from 0.865 g/cc to 0.875 g/cc (1 g/cc=1 g/cm$^3$).

In one embodiment, or a combination of embodiments described herein, the ethylene/alpha-olefin interpolymer of component A has a melt index (I2) from 0.2 to 30 g/10 min, or from 0.3 to 20 g/10 min, or from 0.4 to 10 g/10 min, or from 0.5 to 2.0 g/10 min.

In an embodiment, or a combination of embodiments described herein, component A has a number average molecular weight (Mn(conv))≥10,000, or ≥20,000, or ≥30,000, or ≥40,000, or ≥45,000 g/mol. In an embodiment, or a combination of embodiments described herein, the least one ethylene/-alpha-olefin interpolymer of component A has a number average molecular weight (Mn)≤150,000, or ≤120,000, or ≤100,000, or ≤90,000, or ≤80,000, g/mol.

In an embodiment, or a combination of embodiments described herein, component A has a weight average molecular weight (Mw(conv))≥80,000, or ≥85,000, or ≥90,000, or ≥95,000, or ≥100,000 g/mol. In an embodiment, or a combination of embodiments described herein, the least one ethylene/-alpha-olefin interpolymer of component A has a weight average molecular weight (Mw)≤300,000, or ≤250,000, or ≤200,000, or ≤150,000, g/mol.

In an embodiment, or a combination of embodiments described herein, component A has a molecular weight distribution (Mw(conv)/Mn(conv))≥1.2, or ≥1.5, or ≥1.8, or ≥2.0, or ≥2.2, or ≥2.5. In an embodiment, or a combination of embodiments described herein, component A has a molecular weight distribution (Mw(conv)/Mn(conv))≤3.5, or ≤3.2≤3.0, or ≤2.8.

In one embodiment, or a combination of embodiments described herein, component A has a tan delta (0.1 rad/sec, 190° C.) value≤30, or ≤25, or ≤20 or ≤15, or ≤12, and ≥0, or ≥1.0 or ≥3.0, or ≥5.0, or ≥8.0.

In one embodiment, or a combination of embodiments described herein, component A has a viscosity (V0.1 rad/sec, 190° C.)≥1000, or ≥2000, or ≥4000, or ≥6000, or ≥8000. In an embodiment, or a combination of embodiments described herein, component A has a viscosity (V0.1 rad/sec, 190° C.)≤100,000, or ≤90,000, or ≤80,000, or ≤70,000, or ≤60,000, or ≤50,000, or ≤40,000, or ≤30,000, or ≤20,000, or ≤10,000.

In one embodiment, or a combination of embodiments described herein, component A has a viscosity ratio (V0.1 rad/sec, 190° C./V100 rad/sec, 190° C.) from 1.0 to 30, or from 2.0 to 20, or from 3.0 to 15, or from 4.0 to 10.

In one embodiment, or a combination of embodiments described herein, the composition comprises ≥10 wt %, or ≥12 wt %, or ≥14 wt %, or ≥16 wt %, or ≥18 wt %, or ≥20 wt % of the sum of component A and component B, based on the weight of the composition.

In one embodiment, or a combination of embodiments described herein, the composition comprises ≤50 wt %, or ≤45 wt %, or ≤40 wt %, or ≤35 wt %, or ≤30 wt %, or ≤25 wt % of the sum of component A and component B, based on the weight of the composition.

In one embodiment, or a combination of embodiments described herein, the composition further comprises a propylene-based polymer.

In one embodiment, or a combination of embodiments described herein, the propylene-based polymer has a melt flow rate (MFR) from 1.0 to 120 g/10 min, or from 2.0 to 100 g/10 min, or from 5.0 to 80 g/10 min, or from 10 to 60 g/10 min, or from 25 to 50 g/10 min, or from 30 to 40 g/10 min.

In one embodiment, or a combination of embodiments described herein, the propylene-based polymer has a density from 0.850 to 1.00 g/cc, or from 0.860 to 0.980 g/cc, or from 0.870 to 0.970 g/cc, or from 0.880 to 0.960 g/cc (1 cc=1 cm$^3$).

In one embodiment, or a combination of embodiments described herein, the propylene-based polymer has a density from 0.885 to 0.915 g/cc, or from 0.890 to 0.910 g/cc, or from 0.895 to 0.905 g/cc.

In one embodiment, or a combination of embodiments described herein, the propylene-based polymer has a MWD from 1.0 to 50, or from 2.0 to 30, or from 3.0 to 15, or from 3.0 to 10, or from 3.0 to 5.0.

In one embodiment, or a combination of embodiments described herein, the propylene-based polymer is a polypropylene homopolymer.

In one embodiment, or a combination of embodiments described herein, the propylene-based polymer is an impact copolymer polypropylene.

In one embodiment, or a combination of embodiments described herein, the propylene-based polymer is an impact copolymer polypropylene comprising from 5 to 20 wt %, or from 8 to 18 wt %, or from 10 to 15 wt % of a dispersed ethylene-propylene or propylene-ethylene rubber phase, based on the total weight of the propylene-based polymer as determined by the xylene extraction method described below.

In one embodiment, or a combination of embodiments described herein, the propylene-based polymer is a propylene/alpha-olefin interpolymer, and further a propylene/alpha-olefin copolymer.

In one embodiment, or a combination of embodiments described herein, the propylene-based polymer is a propylene/ethylene interpolymer, and further a propylene/ethylene copolymer.

In one embodiment, or a combination of embodiments described herein, the propylene-based polymer is present in an amount ≥50 wt %, or ≥55 wt %, or ≥60 wt %, based on the weight of the composition.

In one embodiment, or a combination of embodiments described herein, the propylene-based polymer is present in an amount ≤90 wt %, or ≤85 wt %, or ≤70 wt %, based on the weight of the composition.

In one embodiment, or a combination of embodiments described herein, the composition comprises ≥70 wt %, or ≥75 wt %, or ≥80 wt %, or ≥85 wt % of the sum of the component A, component B and propylene-based polymer, based on the weight of the composition.

In one embodiment, or a combination of embodiments described herein, the composition comprises ≤98 wt %, or ≤95 wt %, or ≤90 wt % of the sum of the component A, component B and propylene-based polymer, based on the weight of the composition.

In one embodiment, or a combination of embodiments described herein, component A is present in an amount from 12 wt % to 50 wt %, or from 14 wt % to 40 wt %, or from 16 wt % to 30 wt %, or from 18 wt % to 25 wt % based on the weight of the composition.

In one embodiment, or a combination of embodiments described herein, the weight ratio of the propylene-based polymer to component A is from 1.0 to 5.0, or from 1.5 to 5.0, or from 2.0 to 5.0, or from 2.5 to 5.0.

In one embodiment, or a combination of embodiments described herein, the weight ratio of the propylene-based polymer to component A is from 1.0 to 5.0, or from 1.2 to 4.5, or from 1.4 to 4.0, or from 1.6 to 3.5.

In one embodiment, or a combination of embodiments described herein, the composition further comprises ≤0.100 wt %, or ≤0.050 wt %, or ≤0.020 wt %, or ≤0.010 wt %, or ≤0.050 wt %, or ≤0.020 wt %, or ≤0.010 wt %, or ≤0.005 wt % of a curing agent, based on the weight of the composition. In one embodiment, or a combination of embodiments described herein, the composition does not comprises a curing agent. Illustrative curing agents include, sulfur-containing compounds, such as elemental sulfur, 4,4'-dithiodimorpholine, thiuram di- and polysulfides, alkylphenol disulfides, and 2-morpholino-dithiobenzothiazole; peroxides, such as di-tertbutyl peroxide, tertbutylcumyl peroxide, dicumyl peroxide, 2,5-dimethyl-2,5-di-(tertbutylperoxy) hexane, di-(tertbutylperoxyisopropyl) benzene, tertbutyl peroxybenzoate and 1,1-di-(tertbutylperoxy)-3,3,5-trimethylcyclohexane; azo-compounds; silanes, such as vinyl triethoxy or vinyl tri-methoxy silane; dinitroso compounds, such as p-quinone-dioxime and p,p'-dibenzoylquinone-dioxime; phenol-formaldehyde resins containing hydroxymethyl or halomethyl functional groups.

In one embodiment, or a combination of embodiments described herein, the composition further comprises ≤0.100 wt %, or ≤0.050 wt %, or ≤0.020 wt %, or ≤0.010 wt %, or ≤0.050 wt %, or ≤0.020 wt %, or ≤0.010 wt %, or ≤0.005 wt % of a peroxide curing agent, based on the weight of the composition. In a further embodiment, the composition does not comprises a peroxide curing agent.

In one embodiment, or a combination of embodiments described herein, the composition further comprises ≥0.1 wt %, or ≥0.2 wt %, or ≥0.5 wt %, or ≥1.0 wt %, or ≥2.0 wt %, or ≥3.0 wt %, or ≥4.0 wt %, or ≥5.0 wt %, or ≥0.6 wt %, or ≥7.0 wt %, or ≥8.0 wt %, or ≥9.0 wt %, or ≥10 wt % of a mineral filler (for example, talc), based on the weight of the composition. In one embodiment, or a combination of embodiments described herein, the composition further comprises ≤40 wt %, or ≤35 wt %, or ≤30 wt %, or ≤25 wt %, or ≤20 wt % of a mineral filler (for example, talc), based on the weight of the composition.

In one embodiment, or a combination of embodiments described herein, the composition comprises from 5 wt % to 30 wt %, or from 10 wt % to 25 wt % of the filler, such as talc, based on the weight of the composition. Other fillers include fillers: calcium carbonate, clay, carbon black, silica, titanium dioxide, diatomaceous earth.

In one embodiment, or a combination of embodiments described herein, the weight ratio of the filler to component A is from 0.80 to 1.20, or from 0.85 to 1.15, or from 0.90 to 1.10, or from 0.95 to 105. In a further embodiment, the filler is selected from talc, calcium carbonate, clay, carbon black, silica, titanium dioxide, or diatomaceous earth, and further talc, calcium carbonate, carbon black, silica, or titanium dioxide, and further talc, carbon black, or silica. In one embodiment, the filler is talc.

In one embodiment, or a combination of embodiments described herein, the composition comprises of carbon black. In a further embodiment, the carbon black is present in an amount from 5.0 wt % to 50 wt %, based on the weight of the composition.

In one embodiment, or a combination of embodiments described herein, the composition has a Flexural Modulus (1% secant) from 100 to 250 kpsi, or from 120 to 250 kpsi, or from 140 to 250 kpsi, or from 160 to 250 kpsi, or from 180 to 250 kpsi.

In one embodiment, or a combination of embodiments described herein, the composition has an Izod Strength, at 10° C., from 40 to 60 $kJ/m^2$, or from 40 to 55 $kJ/m^2$.

In one embodiment, or a combination of embodiments described herein, the composition has an Izod Strength, at 0° C., from 30 to 50 $kJ/m^2$.

In one embodiment, or a combination of embodiments described herein, the composition has an Izod Strength, at −10° C., from 15 to 25 $kJ/m^2$.

In one embodiment, or a combination of embodiments described herein, the composition has an Izod Strength, at −20° C., from 8.0 to 20 $kJ/m^2$.

In one embodiment, or a combination of embodiments described herein, the composition has a melt flow rate (MFR) from 10 to 20 g/10 min, or from 12 to 18 g/10 min.

In one embodiment, or a combination of embodiments described herein, the composition further comprises ≥0.1 wt %, or ≥0.2 wt %, or ≥0.5 wt % of one or more antioxidants, based on the weight of the composition. In one embodiment, or a combination of embodiments described herein, the composition further comprises ≤2.0 wt %, or ≤1.5 wt %, or ≤1.0 wt % of one or more antioxidants, based on the weight of the composition.

In one embodiment, or a combination of embodiments described herein, the composition comprises ≤1.00 wt %, or ≤0.50 wt %, or ≤0.10 wt %, or ≤0.05 wt % of a hydrocarbon oil. In a further embodiment, the composition does not comprises a hydrocarbon oil.

In one embodiment, or a combination of embodiments described herein, the composition comprises ≤1.00 wt %, or ≤0.50 wt %, or ≤0.10 wt %, or ≤0.05 wt % of a styrene-based polymer (comprises a majority amount of polymerized styrene, based on the weight of the polymer). In a further embodiment, the composition does not comprises a styrene-based polymer. In one embodiment, or a combination of embodiments described herein, the composition comprises ≤1.00 wt %, or ≤0.50 wt %, or ≤0.10 wt %, or ≤0.05 wt % of a styrene-block copolymer rubber. In a further embodiment, the composition does not comprises a styrene-block copolymer rubber. In one embodiment, or a combination of embodiments described herein, the composi-tion comprises ≤1.00 wt %, or ≤0.50 wt %, or ≤0.10 wt %, or ≤0.05 wt % of a styrene-butadiene rubber. In a further embodiment, the composition does not comprises a styrene-butadiene rubber.

In one embodiment, or a combination of embodiments described herein, the composition comprises ≤1.00 wt %, or ≤0.50 wt %, or ≤0.10 wt %, or ≤0.05 wt % of a polybutadiene. In a further embodiment, the composition does not comprises a polybutadiene.

In one embodiment, or a combination of embodiments described herein, the composition comprises ≤1.00 wt %, or ≤0.50 wt %, or ≤0.10 wt %, or ≤0.05 wt % of a polyisoprene. In a further embodiment, the composition does not comprises a polyisoprene.

In one embodiment, or a combination of embodiments described herein, the composition comprises ≤1.00 wt %, or ≤0.50 wt %, or ≤0.10 wt %, or ≤0.05 wt % of a polymer comprising fluoro groups. In a further embodiment, the composition does not comprises a polymer comprising fluoro groups.

In one embodiment, or a combination of embodiments described herein, the composition comprises ≤1.00 wt %, or ≤0.50 wt %, or ≤0.10 wt %, or ≤0.05 wt % of a perfluoroalkyl compound (a compound that comprises at least one perfluoroalkyl group). In a further embodiment, the composition does not comprises a perfluoroalkyl compound.

Also provided is an article comprising at least one component formed from the composition of one embodiment, or a combination of embodiments described herein.

In one embodiment, or a combination of embodiments described herein, the article is selected from the group consisting of the following: injection molded parts, foams, automotive parts, building and construction materials, building and construction materials, and shoe components. In one embodiment, or a combination of embodiments described herein, the article is selected from the group consisting of the following: bumper fascia, door trim, instrument panel, airbag cover, and fendors. An inventive article may comprise a combination of two or more embodiments as described herein.

Additives and Applications

The composition may comprise one or more additives, such as fillers, antioxidants, flame retardants, foaming agents, colorants or pigments, and thermoplastic polymers, among others. Additional additives include, but are not limited to, fillers, flame retardants, colorants or pigments, thermoplastic polymers, and combinations thereof. Such additives can be employed in a desired amount to achieve their desired effect. Suitable fillers include, but are not limited to, clay, talc, or carbon black. In one embodiment, or a combination of embodiments described herein, the composition further comprises at least one antioxidant. Illustrative antioxidants include, but are not limited to, peroxy and alkoxy radical traps (amines and hindered phenols), hydroperoxide decomposers, and synergist.

In one embodiment, or a combination of embodiments described herein, the composition further comprises a thermoplastic polymer. Illustrative polymers, include, but not limited to, propylene-based polymers, ethylene-based polymers, and olefin multi-block interpolymers. Suitable ethylene-base polymers include, but are not limited to, high density polyethylene (HDPE), linear low density polyethylene (LLDPE), very low density polyethylene (VLDPE), ultra-low density polyethylene (ULDPE), homogeneously branched linear ethylene polymers, and homogeneously branched substantially linear ethylene polymers (that is homogeneously branched long chain branched ethylene polymers).

The compositions of the present invention may be used to prepare a variety of articles, or their component parts or portions. The inventive compositions may be converted into a finished article of manufacture by any one of a number of conventional processes and apparatus. Illustrative processes include, but are not limited to, injection molding, extrusion, calendaring, compression molding, and other typical thermoset material forming processes. Articles include, but are not limited to, sheets, foams, molded goods, and extruded parts. Additional articles include automotive parts, bumper fascia, instrument panels, door trims, airbag covers, fendors, tailgates, and liftgates, computer parts, building materials and footwear components. A skilled artisan can readily augment this list. The compositions are especially suitable for use in automotive injection molded parts.

Definitions

Unless stated to the contrary, implicit from the context, or customary in the art, all parts and percents are based on weight, and all test methods are current as of the filing date of this disclosure. The term "composition" and like terms, as used herein, means a mixture or blend of two or more materials which comprise the composition, as well as reaction products and decomposition products formed from the materials of the composition.

The transitions (or terms) "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure) and the term interpolymer as defined hereinafter. Trace amounts or impurities, such as catalyst residues, can be incorporated into and/or within the polymer.

The term "interpolymer," as used herein, refers to a polymer prepared by the polymerization of at least two different types of monomers. The generic term interpolymer thus includes copolymers (employed to refer to polymers prepared from two different types of monomers), and polymers prepared from more than two different types of monomers (e.g., terpolymers (three different monomer types) and tetrapolymers (four different monomer types)).

"Ethylene/α-olefin interpolymer," and like terms, as used herein, refers to a polymer that comprises, in polymerized form, ethylene, and an α-olefin. In one embodiment, the "ethylene/α-olefin interpolymer" comprises a majority weight percent of ethylene (based on the weight of the interpolymer).

"Ethylene/α-olefin/diene interpolymer," and like terms, as used herein, refers to a polymer that comprises, in polymerized form, ethylene, an α-olefin, and a diene (for example, a non-conjugated diene). In one embodiment, the "ethylene/α-olefin/diene interpolymer" comprises a majority weight percent of ethylene (based on the weight of the interpolymer).

The term "ethylene/α-olefin copolymer," and like terms, as used herein, refers to a copolymer that comprises, in polymerized form, 50 wt % or a majority of ethylene, based on the weight of the copolymer, and an α-olefin as the only monomer types.

The term "ethylene-based polymer," and like terms, as used herein, refers to a polymer that comprises, in polymerized form, 50 wt % or a majority weight percent of ethylene monomer (based on the weight of the polymer), and optionally may comprise one or more comonomers).

The term "propylene-based polymer," and like terms, as used herein, refers to a polymer that comprises, in polymerized form, a majority weight percent of propylene monomer (based on the weight of the polymer), and optionally may comprise one or more comonomers).

The term "propylene/alpha-olefin interpolymer," and like terms, as used herein, refers to a polymer that comprises, in polymerized form, a majority weight percent of propylene monomer (based on the weight of the polymer), and an alpha-olefin.

The term "propylene/α-olefin copolymer," and like terms, as used herein, refers to a copolymer that comprises, in polymerized form, a majority of propylene, based on the weight of the copolymer, and an α-olefin as the only monomer types.

The term "propylene/ethylene interpolymer," and like terms, as used herein, refers to a polymer that comprises, in polymerized form, a majority weight percent of propylene monomer (based on the weight of the polymer), and ethylene.

The term "propylene/ethylene copolymer," and like terms, as used herein, refers to a copolymer that comprises, in polymerized form, a majority of propylene, based on the weight of the copolymer, and an ethylene as the only monomer types.

As known in the art, a "hydrocarbon" contains only carbon and hydrogen atoms.

Embodiments of the present disclosure include but are not limited to the following:

1. A composition comprising:
   A) an ethylene/alpha-olefin interpolymer having a density from 0.854 to 0.890 g/cc, and a melt index (I2) from 0.2 to 30 g/10 min;
   B) a silicone oil having a viscosity≤5000 cSt, at 25° C.; and wherein component B is present in an amount from 1.0 wt % to 5.0 wt %, based on the weight of the sum weight of components A and B.
2. The composition of embodiment 1, wherein the ethylene/alpha-olefin interpolymer of component A is in pellet form.
3. The composition of embodiment 1 or embodiment 2, wherein the ethylene/alpha-olefin interpolymer of component A is an ethylene/alpha-olefin copolymer.
4. The composition of embodiment 3, wherein the alpha-olefin is a C3-C20 alpha-olefin.
5. The composition of embodiment 1 or embodiment 2, wherein the ethylene/alpha-olefin interpolymer of component A is an ethylene/alpha-olefin/diene interpolymer.
6. The composition of any one of the previous embodiments, wherein the ethylene/alpha-olefin interpolymer of component A has a density from 0.860 to 0.880 g/cc.
7. The composition of any one of the previous embodiments, wherein the ethylene/alpha-olefin interpolymer of component A has a melt index (I2) from 0.5 to 10 g/10 min.
8. The composition of any one of the previous embodiments, wherein the composition comprises ≥90 wt % of component A, based on the sum weight of components A and B.
9. The composition of any one of the previous embodiments, wherein the composition comprises ≥10 wt % of the sum of component A and component B, based on the sum weight of the composition.
10. The composition of any one of the previous embodiments, further comprising a propylene-based polymer.
11. The composition of embodiment 10, wherein the propylene-based polymer has a melt flow rate (MFR) from 1 to 120 g/10 min.
12. The composition of embodiment 10 or embodiment 11, wherein the propylene-based polymer has a density from 0.890 g/cc to 0.910 g/cc.
13. The composition of any one of embodiments 10-12, wherein the propylene-based polymer has a MWD from 2.0 to 30.
14. The composition of any one of embodiments 10-13, wherein the propylene-based polymer is a polypropylene homopolymer or an impact copolymer polypropylene
15. The composition of any one of embodiments 10-14, wherein the propylene-based polymer is present in an amount ≥50 wt %, based on the weight of the composition.
16. The composition of any one of embodiments 10-15, wherein the composition comprises ≥70 wt % of the sum of the component A, component B and propylene-based polymer, based on the weight of the composition.
17. The composition of any one of embodiments 10-16, wherein the weight ratio of the propylene-based polymer to component A is from 1.0 to 5.0.
18. The composition of any one of the previous embodiments, wherein the composition does not comprise a peroxide curing agent.
19. The composition any one of the previous embodiments, wherein the composition further comprises talc.
20. The composition of embodiment 19, wherein the talc is present in an amount from 5.0 wt % to 35 wt %, based on the weight of the composition.
21. The composition of any one of the previous embodiments, wherein the composition does not comprise a hydrocarbon oil.
22. The composition of any one of the previous embodiments, wherein the composition has a Flexural Modulus (1% secant) from 100 to 250 kpsi.
23. The composition any one of the previous embodiments, wherein the composition has an Izod Strength, at 10° C., from 40 to 55 kJ/m$^2$.
24. The composition of any one of the previous embodiments, wherein the composition has an Izod Strength, at 0° C., from 30 to 50 kJ/m$^2$.
25. The composition of any one of the previous embodiments, wherein the composition has an Izod Strength, at −20° C., from 8.0 to 20 kJ/m$^2$.
26. The composition of any one of the previous embodiments, wherein the composition has an Izod Strength, at −10° C., from 15 to 25 kJ/m$^2$.
27. The composition of any one of the previous embodiments, wherein the composition has a melt flow rate (MFR) from 10 to 20 g/10 min.
28. An article comprising at least one component formed from the composition of any one of the previous embodiments.

Test Methods

Density

Polymer density was measured in accordance with ASTM D-792.

Melt Index

Melt index (I2) of an ethylene-based polymer is measured in accordance with ASTM D-1238, condition 190° C./2.16 kg. Melt index (I5) of an ethylene-based polymer is measured in accordance with ASTM D-1238, condition 190°

C./5.0 kg. Melt index (I10) of an ethylene-based polymer is measured in accordance with ASTM D-1238, condition 190° C./10.0 kg. High load melt index (I21) of an ethylene-based polymer is measured in accordance with ASTM D-1238, condition 190° C./21.0 kg. For propylene-based polymers, the melt flow rate (MFR) is measured in accordance with ASTM D-1238, condition 230° C./2.16 kg.

Xylene Extraction

The current methods are established based on ASTM Xylene extraction approaches with slight modification. In particular, 4±0.3 g of polymer is weighed (weight of M is recorded to the nearest 0.0001 g) and added into the reflux flask having 200 ml of inhibited o-xylene solvent. The solvent is heated to boiling and starting to reflux in the setup. The refluxing is maintained for an additional 30 mins, and then air-cooled to room temperature. After that, the flask is placed in a water bath at 25° C. for 45 min, and then 100 ml of the filtered solution is measured with a graduated cylindered. The 100 ml filtrate was then transferred into an aluminum pan. The weight of the aluminum pan ($M_1$) need to be carefully measured to the nearest 0.0001 g, after heating the pan at 150° C. for minimum 2 hours to remove moisture and cooling to room temperature in the desiccator. To evaporate the solvent in the aluminum pan, the pan is heated on a hotplate gently. After the solvent gets fully evaporated, the pan is then placed into 100±5° C. vacuum oven for approximately 2 hours. Later, the pan is cooled in a desiccator to room temperature before weighing again the aluminum pan to get the weight of $M_2$ to the nearest 0.0001 g. The weight fraction of the extract materials is then calculated with the following formula: $f=2\times(M_2-M_1)/M$.

Differential Scanning Calorimetry (DSC)

Differential Scanning calorimetry (DSC) is used to measure crystallinity in ethylene-based (PE) samples and propylene-based (PP) samples. About "5 to 8 mg" of the film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve, and the crystallization temperature ($T_a$) is determined from the first cooling curve.

Gel Permeation Chromatography

The chromatographic system consisted of either a Polymer Laboratories Model PL-210 or a Polymer Laboratories Model PL-220. The column and carousel compartments were operated at 140° C. The columns were three Polymer Laboratories, 10-micron Mixed-B columns. The solvent used was 1,2,4 trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute.

Calibration of the GPC column set was performed with 21 "narrow molecular weight distribution polystyrene standards," with molecular weights ranging from 580 to 8,400,000 g/mole, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: Mpolyethylene=A×(Mpolystyrene)$^B$, where M is the molecular weight, A has a value of 0.431 and B is equal to 1.0 (as described in Williams and Ward, J. Polym. Sc., Polym. Let., 6, 621 (1968)). Polyethylene equivalent molecular weight calculations were performed using Viscotek TriSEC software Version 3.0.

Dynamic Mechanical Spectroscopy (DMS)

Small angle oscillatory shear (melt DMS) was performed using a TA Instruments ARES, equipped with "25 mm parallel plates," under a nitrogen purge. The time between sample loading, and beginning of the test, was set to five minutes for all samples. The experiments were performed at 190° C., over a frequency range from 0.1 to 100 rad/s. The strain amplitude was adjusted, based upon the response of the samples, from 1 to 3%. The stress response was analyzed in terms of amplitude and phase, from which, the storage modulus (G'), loss modulus (G"), dynamic viscosity η*, and tan delta were calculated. Specimens for Dynamic Mechanical Spectroscopy were "25 mm diameter×3.3 mm thick" compression molded discs, formed at 180° C., and 10 MPa molding pressure, for five minutes, and then quenched between chilled platents (15-20° C.) for two minutes. The rheology ratio of the viscosity at 0.1 rad/sec to the viscosity at 100 rad/sec (V0.1N100 at 190° C.; also referred to as "RR") was recorded.

Mooney Viscosity

Mooney Viscosity (ML1+4 at 125° C.) of an interpolymer (e.g., ethylene/α-olefin/diene interpolymer or polymer blend, was measured in accordance with ASTM 1646-04, using a large rotor, with a one minute preheat time and a four minute rotor operation time. The instrument was an Alpha Technologies Mooney Viscometer 2000.

Mooney Viscosity (ML1+4 at 100° C.) of a composition (formulation) was measured in accordance with ASTM 1646-04, using a large rotor, with a one minute preheat time and a four minute rotor operation time. The instrument was an Alpha Technologies Mooney Viscometer 2000.

13C NMR Method for EPDM Composition Analysis and Tacticity (% mm)

The samples were prepared by adding approximately "2.6 g" of a "50/50 mixture of tetrachloroethane-d2/orthodichlorobenzene" that is "0.025M" in chromium acetylacetonate (relaxation agent) to "0.2 g sample" in a 10 mm NMR tube. The samples were dissolved, and homogenized, by heating the tube and its contents to 150° C. The data were collected using a Bruker 400 MHz spectrometer, equipped with a Bruker Dual DUL high-temp. CryoProbe. The data was acquired using "160 scans per data file," a six second pulse repetition delay, with a sample temperature of 120° C. The acquisition was carried out using a spectral width of 25,000 Hz and a file size of 32K data points. NMR spectral analysis of each composition of the examples was carried out using the following analysis method. Quantitation of monomers present in EPDM can also be calculated using the following equations (1 through 9). The calculation of moles ethylene normalizes the spectral range from 55.0 to 5.0 ppm to 1000 integral units. The contribution under the normalized integral area only accounts for 7 of the ENB carbons. The ENB diene peaks at 111 and 147 ppm are excluded from the calculation due to concerns that double bonds may react at high temperatures.

$$molesEth = \frac{(1000 - 3^*molesP - 7^*molesENB)}{2};$$ Eqn. 1

$$molesENB = CH3(13.6 - 14.7 ppm);$$ Eqn. 2

$$molesP = CH3(19.5 - 22.0 ppm);$$ Eqn. 3

$$\text{mole \% ethylene} = \frac{100^*molesE}{molesE - molesP - molesENB};$$ Eqn. 4

$$\text{mole \% propylene} = \frac{100^*molesP}{molesE + molesP + molesENB};$$ Eqn. 5

$$\text{mole \% ENB} = \frac{100^*molesENB}{molesE + molesP + molesENB};$$ Eqn. 6

$$Wt \text{ \% ethylene} = \frac{100^*\text{mole \% } E^*28}{\text{mole \% } E^*28 - \text{mole \% } P^*42 - \text{mole \% } ENB^*120};$$ Eqn. 7

$$Wt \text{ \% propylene} = \frac{100^*\text{mole \% } P^*42}{\text{mole \% } E^*28 - \text{mole \% } P^*42 - \text{mole \% } ENB^*120};$$ Eqn. 8

$$Wt \text{ \% ENB} = \frac{100^*\text{mole \% } ENB^*120}{\text{mole \% } E^*28 + \text{mole \% } P^*42 + \text{mole \% } ENB^*120};$$ Eqn. 9

Propylene Tacticity % mm Area 13C NMR

The 13C NMR spectral analysis of the EPDM samples was used to quantitate the level of tacticity % mm. The NMR was performed in a "50/50 mixture of tetrachloroethane-d2/orthodichlorobenzene," as described above. An NMR spectral analysis (see above) of the inventive EPDMs displayed a significant "% Peak Area from 21.3 ppm-22.0 ppm [rmmr, mmmr, mmmm]," typically greater than 3.5% of the total integral area from 19.5 ppm to 22.0 ppm. Peak responses in this region typically are related to differences in propylene tacticity (% mm) that have been incorporated into the EPDM. A similar analysis can be done for another type of ethylene/α-olefin/diene interpolymer. Spectral data were referenced to the EEE backbone (three or more repeating units of polymerized ethylene) at 30 ppm. Thus, "% Peak Area (from 21.3 ppm-22.0 ppm)"={[(area from 21.3 ppm to 22.0 ppm)/(total integral area from 19.5 ppm to 22.0 ppm)]× 100}.

EXPERIMENTAL

Materials

Materials used in this study are shown below, in Table 1 and the noted structures. Note the viscosity of the PMX-200 was measured at 25° C., and the viscosity of UCONTh OSP-460 and PARALUX® 6001R were measured at 40° C.

***TABLE 1

Polymers and Additives

| Ethylene/alpha-olefin interpolymer | Density (g/cc) | MI and MFR* | Viscosity | Chemical Composition | Source |
|---|---|---|---|---|---|
| ENGAGE ™ 8100 (EG8100) | 0.870 | MI = 1.0 | — | Ethylene/octene copolymer** | Dow |
| PROFAX SD242 | 0.898 | MFR = 35 | — | Impact copolymer polypropylene with 13.6 wt % of EP rubber | Lyondel 1Basell |
| JETFIL ® 700C | — | — | — | talc | Imerys |
| IRGANOX ® B225 | — | — | — | Antioxidant | BASF |
| XIAMETER ™ PMX-200 Silicone Fluids | — | — | 100, 350, and 5000 cSt at 25° C. | Polydimethylsiloxanes (PDMS) | Dow |
| MB50-001 Master Batch | — | — | — | 50 wt % ultra-high molecular weight PDMS loaded polypropylene homopolymer master batch | Dow |
| UCON ™ OSP-460 | — | — | 460 cSt at 40° C. | Polyether | Dow |
| PARALUX ® 6001R | — | — | 107 cSt at 40° C. | 70/30% paraffinic/ naphthenic hydrocarbon oil | Chevron |

*MI is at 2.16 kg, 190° C., and MFR is at 2.16 kg, 230° C.
**random distribution of octene (alpha-olefin).
***Trademark and registered trademark symbols are not carried out below.

A) Compositions (Imbibed or Compounded Pellets)
B) Representative Procedure

For each composition (except the control polymers), polymer pellets (about 10 lbs) were imbibed with the oil or melt mixed with a twin-screw extruder, as noted below in Table 2. The imbibing process was done at room temperature, and ambient pressure, for 5 minutes to 72 hours. For the imbibing process, the elastomer pellets and oil were placed together in a plastic bag and tumbled to ensure uniform coating of the pellets with the oil.

TABLE 2

List of compositions of silicone oil incorporated EG8100 and process of incorporation.

| Composition | Ethylene/ alpha-olefin interpolymer Component A | Additives | Incorporation methods | Oil (wt %)* |
|---|---|---|---|---|
| Control A | EG8100 (control) | N/A | N/A | 0 |
| Comparative B | EG8100 | Paraffin (PARALUX 6001R) | Imbibing 72 hr | 10 |
| Comparative C | EG8100 | Polyether (UCON OSP-460) | Imbibing 72 hr | 2.5 |
| Inventive 1 | EG8100 | Silicone (PMX-200, 350 cSt) Component B | Imbibing 72 hr | 2.5 |
| Inventive 2 | EG8100 | Silicone (PMX-200, 350 cSt) Component B | Imbibing 5 minutes | 2.5 |
| Inventive 3 | EG8100 | Silicone (PMX-200, 350 cSt) Component B | Compounded | 2.5 |
| Inventive 4 | EG8100 | Silicone (PMX-200, 350 cSt) Component B | Imbibing 5 minutes | 1.0 |
| Inventive 5 | EG8100 | Silicone (PMX-200, 350 cSt) Component B | Imbibing 5 minutes | 5.0 |
| Inventive 6 | EG8100 | Silicone (PMX-200, 100 cSt) Component B | Imbibing 5 minutes | 2.5 |
| Inventive 7 | EG8100 | Silicone (PMX-200, 5000 cSt) Component B | Imbibing 5 minutes | 2.5 |

*The wt % based on weight of silicone oil and EG8100.
N/A = not applicable.

C) Compositions (TPOs)
Representative Procedure

Each composition (TPO) was mixed in a twin-screw extruder, i.e., a Coperion ZSK-25 mm twin screw extruder equipped with a water bath and strand cutter. The extruder configuration and the temperature profile for the samples are shown in table 3. All the components except for talc were dry blended in a plastic bag and then fed to the main feed throat via a loss-in-weight feeder. The talc was fed to the main feed throat via a separate powder feeder.

TABLE 3

Compounding conditions for the TPOs

| ZSK-25 | Zone 1 | Zone 2 | Zone 3 | Zone 4 | Zone 5 | Zone 6 | Zone 7 | Zone 8 | Extruder |
|---|---|---|---|---|---|---|---|---|---|
| Set points | 130° C. | 180° C. | 200° C. | 200° C. | 200° C. | 200° C. | 200° C. | 200° C. | 300 RPM |

TABLE 4

Compositions (TPO Formulations)

| TPO Composition | Composition/ Component A | Type of Oil in Composition | Amount of Oil in TPO Composition (wt %*) | Amount of ethylene/ alpha-olefin interpolymer in TPO Composition (wt %)* | PROFAX SD242, wt %* | JETFIL 700C, wt %* | IRGANOX B225, wt %* |
|---|---|---|---|---|---|---|---|
| Comp. SCA | Control A/ EG8100 | N/A | N/A | 19.8 | 60 | 20 | 0.2 |
| Comp. SCC | Comp. B/ EG8100 | Paraffin | 2.0 | 18.8 | 59 | 20 | 0.2 |
| Comp. SCD | Comp. C/ EG8100 | Polyether | 0.5 | 18.3 | 60 | 20 | 0.2 |
| Comp. SCE | Control A/ EG8100 | N/A | N/A | 20 | 59.8 | 20 | 0.2 |
| Comp. SCF | Control A/ EG8100 | Silicone Ultra-high-Mw Masterbach | 0.5 | 19.5 | 59.8 | 20 | 0.2 |
| Inv. SC1 | Inv. 1/ EG8100 | Silicone (Inv. 1) | 0.5 | 19.5 | 59.8 | 20 | 0.2 |
| Inv. SC2 | Inv. 2/ EG8100 | Silicone (Inv. 2) | 0.5 | 19.5 | 59.8 | 20 | 0.2 |
| Inv. SC3 | Inv. 3/ EG8100 | Silicone (Inv. 3) | 0.5 | 19.5 | 59.8 | 20 | 0.2 |
| Inv. SC4 | Inv. 4/ EG8100 | Silicone (Inv. 4) | 0.2 | 19.8 | 59.8 | 20 | 0.2 |
| Inv. SC5 | Inv. 5 / EG8100 | Silicone (Inv. 5) | 1.0 | 19 | 59.8 | 20 | 0.2 |
| Inv. SC6 | Inv. 6/ EG8100 | Silicone (Inv. 6) | 0.5 | 19.5 | 59.8 | 20 | 0.2 |
| Inv. SC7 | Inv. 7/ EG8100 | Silicone (Inv. 7) | 0.5 | 19.5 | 59.8 | 20 | 0.2 |

*Each wt % based on the weight of the TPO composition.
N/A = not applicable.

D) Results

Injection Molding

ASTM D638 Type I tensile bars were injection molded on a Toyo injection molding machine. Molding conditions were optimized to ensure minimal defects in the molded parts via various control experiments. The key injection molding settings are tabulated in Table 5.

TABLE 5

Injection Molding Settings

| Set Temperature (degree C.) | | | | Dosage Volume | Inj.-Hold Switch Over |
|---|---|---|---|---|---|
| Zone 1 | Zone 2 | Zone 3 | Zone 4 | (mm) | Position (mm) |
| 226 | 226 | 226 | 226 | 60 | 15 |

| Setting Injection Pressure (Bar) | Hold Pressure (Bar) | Back Pressure (Bar) | Plasticizing Speed/Screw Spd (rpm) | Injection Speed (mm/s) |
|---|---|---|---|---|
| 2000 | 400 | 50 | 90 | 40 |

Flex Mod, 1% Sec, Kpsi

Flexural modulus was measured according to ASTM D790, using the injection molded Type I tensile bars, and an INSTRON testing machine. The test speed of 0.05 in/min was chosen. Five test sample were measured, and the average reported.

Izod Strength, kJ/m$^2$ (−20° C., −10° C., 0° C., and 10° C.)

The notched IZOD tests were conducted according to ASTM D256. The specimens were die cut from the injection molded tensile Type I bars for a final dimension of "2.5 inch by 0.5 inch by 0.125 inch." The samples were notched along the length of the sample, at the center, in the thickness direction, using an automated notcher with depth of 0.1 inch. The notching half angle was 22.5°, and the radius of curvature at the tip was 0.01 inch. The samples were conditioned for at least 40 hours, at 23+/−2° C. and 50+/−10% relative humidity. For samples that were tested at non-ambient temperatures, the specimens were further conditioned at the test temperature for a minimum of one hour. Here, the testing was conducted at four temperatures (−20° C., −10° C., 0° C., and 10° C.), and each temperature repeated five times to obtain an average value.

It is noted that due to the intrinsic batch-to-batch variation in the TPO performance testing there is usually variation for the same TPO formulation if they were tested at different times from different batches. Therefore, the comparisons noted below are made for TPOs fabricated and tested from the same batch of the experiments.

In Table 6, melt flow rate and stiffness properties are shown for TPO compositions prepared with different types of oils. It was observed that the inventive composition (Inv. SC1) leads to a substantially improved MFR compared to the comparative Comp. SCA. Meanwhile, the addition of the silicone-based oil led to a marginal decrease in the stiffness of the TPO composition. On the other hand, use of polyether-based (Comp. SCD) and paraffinic-based (Comp. SCC) oils result in a similar level of improvement in the melt flowability, but both with lower stiffness.

TABLE 6

Melt flowability and stiffness of the TPO compounds upon incorporating different oils

| TPO Composition | | MFR (dg/min) | Concentration of oil* | Flex Mod, 0.05"/min 1% sec, ksi | St dev |
|---|---|---|---|---|---|
| Comp. SCA | Control A | 14.0 | 0 wt % | 220.2 | 1.2 |
| Comp. SCC | Comparative B | 16.3 | 2.0 wt % | 195.9 | 3.4 |
| Comp. SCD | Comparative C | 16.5 | 0.5 wt % | 204.2 | 2.8 |
| Inv. SC1 | Inventive 1 | 16.2 | 0.5 wt % | 213.1 | 3.4 |

*Each wt % based on weight of the TPO composition.

As shown in Table 7, TPO compositions with silicone oil at 0.5 wt % concentration in the TPO composition (Inv. SC2 and Inv. SC3) also offer substantially improved low-temperature impact performance, compared to the unmodified TPO (Comp. SCE); in particular, see the IZOD strength at −10° C. Again, the stiffness of the TPO composition was not negatively affected by the incorporation of the silicone oil. On the other hand, it was also observed that the stiffness and toughness of the TPO compositions were not affected by the method used to incorporate the silicone oil. Both the "5 minute imbibing (Inv. 2)" and the "twin-screw compounding (Inv. 3)" of the first composition comprising Components A and B lead to similar stiffness and low-temperature impact performance of the TPO compositions.

At a fixed viscosity (350 cSt), the silicone oils with concentration ranged from 0.2 wt % to 1.0 wt. % in the overall TPO composition (1.0 wt. % to 5.0 wt %, based on weight of silicone oil and elastomer; Inv. SC2, Inv. SC4, and Inv. SC5), were observed to have, at least in certain degree, an improvement in either low temperature toughness (particularly at 0° C.), or the melt flowability, or both. These results suggest the inventive compositions, at the proposed compositional range of the oil, offer an improved balance of flow-stiffness-toughness of the TPO compositions.

Since the base ethylene/alpha-olefin interpolymers in the inventive samples (Inv. 1 to 7) were the same as in the

TABLE 7

Flexural stiffness and impact strength of TPOs upon incorporating 0.5 wt % of silicone oil in the TPO formulation via pellet imbibing and twin-screw extruder compounding.

| TPO Composition | | Concentration of silicone oil* | Flex Mod, 0.05"/min 1% sec, ksi | St dev | Izod Strength at x ° C., kJ/m2 | | | |
|---|---|---|---|---|---|---|---|---|
| | | | | | 10 | 0 | −10 | −20 |
| Comp. SCE | Control A | 0 wt % | 219.7 | 2.7 | 39.8 | 29.9 | 9.6 | 7.3 |
| Inv. SC2 | Inv. 2 | 0.5 wt % | 215.6 | 2.1 | 42.3 | 34.1 | 19.8 | 8.6 |
| Inv. SC3 | Inv. 3 | 0.5 wt % | 220.6 | 2.5 | 43.3 | 33.7 | 20.4 | 8.2 |

*Each wt % based on weight of the TPO composition.

Finally, in Table 8, TPO compositions containing silicone oil with different viscosities and different concentrations were compared. It was found that, except for the ultrahigh molecular weight PDMS modified TPO composition, at 0.5 wt % PDMS, other silicone oils at 0.5 wt % all improved the low-temperature toughness (particularly at 0° C.), and the melt flowability of the TPO compositions, at least in a certain degree. In contrary, the ultra-high-molecular-weight PDMS, typically used for improving the TPO scratch resistance, tends to decrease the low-temperature toughness of the TPO composition (see Comp. SCF).

control (Control A), it is expected that the new compositions will provide advantages in pellet handling, as compared to compositions containing a "lower density and higher melting index" ethylene/alpha-olefin interpolymer, because one can achieve a "good MFR TPO composition with good low temperature impact performance" using an inventive composition, and avoid a sticky pellet situation that results from using the lower density, higher melt index interpolymer to achieve the same "MFR composition with good low temperature impact performance."

TABLE 8

Flexural stiffness, melt flowability, and impact strength of TPOs upon incorporating different concentrations and a different viscosity of the silicone oils/ultra-high-molecular-weight PDMS to the TPO formulation.

| TPO Composition | | MFR (dg/min) | Concentration of silicone oil* | Viscosity of the silicone oil in the formulation | Flex Mod, 0.05"/min 1% sec, ksi | stdev | Izod Strength at 0° C., kJ/m² |
|---|---|---|---|---|---|---|---|
| Comp. SCE | Control A | 13.3 | 0 wt % | — | 221.1 | 3.9 | 29.9 |
| Comp. SCF | Control A | 14.7 | 0.5 wt % | Ultra-high-molecular weight | 219.3 | 1.5 | 23.1 |
| Inv. SC2 | Inv. 2/ EG8100 | 16.2 | 0.5 wt % | 350 cSt | 221.5 | 0.6 | 31.2 |
| Inv. SC4 | Inv. 4/ EG8100 | 15.4 | 0.2 wt % | 350 cSt | 224.4 | 2.0 | 31.8 |
| Inv. SC5 | Inv. 5/ EG8100 | 16.3 | 1.0 wt % | 350 cSt | 216.2 | 5.2 | 32.2 |
| Inv. SC6 | Inv. 6 / EG8100 | 15.8 | 0.5 wt % | 100 cSt | 224.8 | 4.4 | 30.4 |
| Inv. SC7 | Inv. 7/ EG8100 | 16.2 | 0.5 wt % | 5000 cSt | 221.5 | 0.6 | 31.2 |

*Each wt % based on weight of the TPO composition.

The invention claimed is:

1. A composition comprising:
    A) from 18 to 25 wt %, based on the weight of the composition, of an ethylene/alpha-olefin interpolymer having a density from 0.860 to 0.880 g/cc, and a melt index (I2) from 0.5 to 2.0 g/10 min;
    B) from 1.0 wt % to 3.0 wt %, based on the weight sum of components A and B, of a silicone oil having a viscosity 100 to 500 cSt, at 25° C.;
    C) ≥60 wt % of a propylene homopolymer having a density from 0.890 g/cc to 0.910 g/cc;
    from 10 to 25 wt %, based on the weight of the composition, of talc.

2. The composition of claim 1, wherein the propylene homopolymer has a melt flow rate (MFR) from 1 to 120 g/10 min.

3. The composition of claim 1, wherein the composition does not comprise a peroxide curing agent.

4. The composition of claim 1, wherein the composition does not comprise a hydrocarbon oil.

5. The composition of claim 1, wherein the composition has a Flexural Modulus (1% secant) from 100 to 250 kpsi.

6. The composition of claim 1, wherein the composition has an Izod Strength, at 10° C., from 40 to 55 KJ/m².

7. The composition of claim 1, wherein the composition has an Izod Strength, at 0° C., from 30 to 50 KJ/m².

8. The composition of claim 1, wherein the composition has an Izod Strength, at −20° C., from 8.0 to 20 KJ/m².

9. The composition of claim 1, wherein the composition has an Izod Strength, at −10° C., from 15 to 25 KJ/m².

10. An article comprising at least one component formed from the composition of claim 1.

* * * * *